July 23, 1946.                H. KORNBLUTT                2,404,383
                          GUIDE WHEEL ARRANGEMENT
                            Filed Dec. 20, 1944
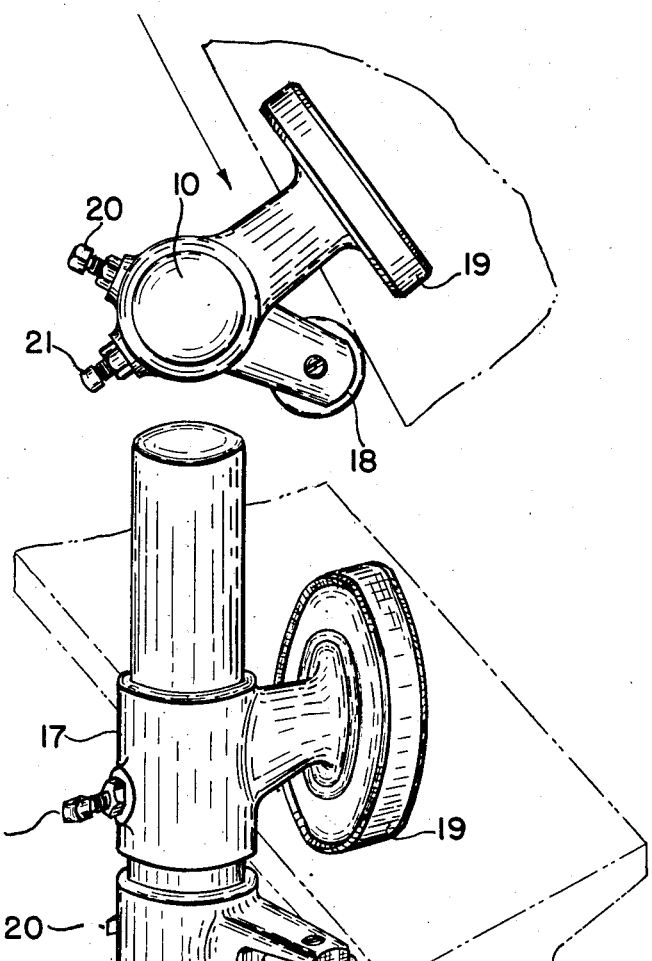
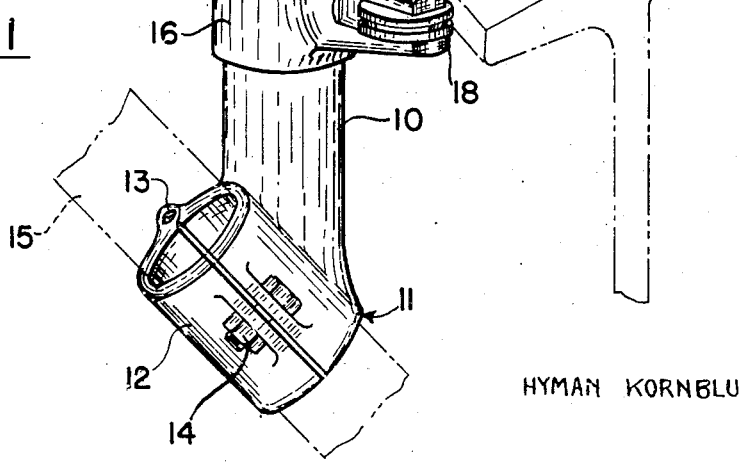
Inventor
HYMAN KORNBLUTT
By
Attorney Patented July 23, 1946

2,404,383

UNITED STATES PATENT OFFICE 2,404,383

GUIDE WHEEL ARRANGEMENT

Hyman Kornblutt, Brooklyn, N. Y.

Application December 20, 1944, Serial No. 569,067

5 Claims. (Cl. 219—8)

(Granted under the act of March 3, 1883, as amended April 30, 1928; 370 O. G. 757)

This invention relates to welding devices and more particularly to a fillet welding device and provides an improved apparatus for controlling a welding tool or tool of similar character along a prescribed path.

Heretofore welding devices, such for example, as the unionmelt welding machine have been employed in welding operations wherein the welding electrode is guided along the work in a prescribed manner, by means of suitable guide wheels or similar apparatus. These guide wheels may bear against the work and may thus support the electrode with relation to the work.

It has been found that in the welding of I beams and T beams by the prior process particularly in ship construction where such beams are welded in deck platform and bulkhead assemblies, it is difficult to provide a uniform guide surface or track along which the welding machine may be guided without interruption. Thus, chocks and brackets which have been welded to the webs of I beams and to the legs of angles obstruct the passage of the standard guiding equipment of the unionmelt welding machine, and necessitate loss of time and interfere with a continuous welding bead due to the stopping, shifting and restarting of the welding machine when each chock or bracket is passed in the process of welding. Approximately six inches of welding is ordinarily skipped at each chock or bracket and must be welded manually upon completion of the automatic welding operation.

In addition to the above it has been found that guide wheels located too close to the welding electrode work unevenly because tightly adhering splatter from the tack welds provide a rough track for the guide wheel.

In the practice of the present invention it has been found that the intermittent operation above noted with the attendant disadvantages is effectively avoided and the welding machine may be kept in continuous uninterrupted operation to make a uniform weld throughout the full extent of its course.

It is therefore an object of the present invention to provide a means whereby a continuous weld may be produced by an electrode which is guided from a point remote from the electrode itself.

It is a further object to provide a guide wheel and support arrangement for a continuous welding apparatus which may readily be applied to and removed from the welding apparatus.

Still another object of the present invention is to provide in combination a guide roller and a guide wheel roller which engage the work at a point remote from the point of contact of a tool therewith and which roller and wheel are so positioned and angularly disposed as normally to urge the guiding arrangement into contact with the guide portion of the work.

Further objects and advantages will be apparent from the following description, claims and the appended drawing in which:

Fig. 1 is a vertical side elevation of one embodiment of the present invention; and Fig. 2 is a top elevation of the embodiment illustrated in Fig. 1.

Referring now to the drawing in detail the present invention comprises a vertically extending support or electrode bearing arm 10 which may be of any desired cross-sectional contour such as the circular construction shown and is provided at its lower part with an off-set electrode engaging clamp 11, including a complementary clamp portion 12 pivoted to the clamp 11 at 13 and secured by any suitable locking arrangement such as the nut and bolt 14.

An electrode 15 shown in dot and dash lines may be clasped by the above clamping arrangement and the point of the electrode may be positioned adjacent the portion to which the weld is to be made.

Two adjustable roller bearing brackets 16 and 17 may be provided as shown. Bracket 16 has a roller 18 which may bear against the side of an I beam as shown in dotted lines; and bracket 17 has a larger roller or guide wheel 19 which may similarly bear against the top of the I beam. Both brackets 16 and 17 may be vertically and rotatably adjusted about the vertical support 10 so as to assume any angular position with respect thereto and may be retained in their adjusted position by means of set screws 20 and 21 respectively.

The enlarged roller 19 rotates in a vertical plane and may rest upon the top of a member to be welded such as the I beam shown for guiding action thereby.

It will be apparent that during the normal operation of the usual type of welding machine, the electrode 15 may be caused to pass along the point of junction between the I beam and the plate to which it is being welded, or other suitable welding seam, and this electrode may be guided along the prescribed path by means of the roller 18 and wheel 19 which bear against the side and top respectively of the I beam.

As particularly shown in Fig. 2 the wheel 19 rotating in a vertical plane about a horizontal axis is preferably so angularly disposed with respect to the I beam along which it travels that there is a continual "toe-out" effect which tends to draw the supporting arm 10 and the electrode supported thereby toward the I beam.

It will be understood that by the words used herein and in the claims it is intended to designate the guiding member along which the guide rollers pass and this guide track may in most instances be a portion of the member to be welded.

From the foregoing description it will be apparent to those skilled in the art that various modifications may be made without departing from the spirit and scope of this invention and it is desired, therefore, that the same be limited only by the scope of the prior art and the appended claims.

The invention described herein may be manufactured and used by or for the Government of the United States of America for governmental purposes without the payment of any royalties thereon or therefor.

Having thus described the invention, what is claimed and desired to be secured by Letters Patent is:

1. In a guide wheel arrangement for the travelling electrode of a welding machine the combination of a vertical guide wheel arm, a guide wheel vertically movable on said arm and mounted for rotation in a vertical plane, a guide roller vertically movable on said arm and mounted for rotation in a horizontal plane, and an electrode grasping means forming a part of the vertical guide wheel arm and adapted to grasp an electrode.

2. In a guide wheel arrangement for the travelling electrode of a welding machine the combination of an electrode bearing arm mounted for movement along a member to be welded, a roller for engaging the side of the member to be welded and adjustable about said mount and having means for retaining it in adjusted position, a guide wheel similarly secured to said arm and having a guide wheel for engagement with the top of the member to be welded, the guide wheel being adjustable to a toed-out relationship with respect to the axis of the member being welded and the direction of electrode movement whereby the arm and the electrode supported thereby may be urged toward the member to be welded during operation.

3. In a guide wheel arrangement for the travelling electrode of a welding machine, the combination of an electrode supporting arm, a guide roller rotatable in a horizontal plane mounted on said arm for vertical sliding movement along the arm and rotary movement around the arm, a guide wheel rotatable in a vertical plane mounted on said arm for vertical sliding movement along the arm and rotary movement around the arm whereby the guide wheel may be adjusted for toed-out relationship with respect to the member to be welded.

4. In a guide wheel arrangement for the travelling electrode of a polygraph welding machine the combination of a travelling electrode bearing arm, a work engaging roller rotatable in a horizontal plane and mounted upon said arm for vertical and rotative adjustment thereabout, a work engaging guide wheel mounted upon said arm for vertical and rotational adjustment thereon said guide wheel being journalled for rotation in a vertical plane and adapted for adjustment with respect to said work so that the wheel presents a toed-out relationship to the work whereby advancing the arm causes the guide wheel to draw the guide roller into engagement with the side of the work.

5. A guide wheel arrangement for an electrode supporting construction wherein a travelling electrode is guided by means of a portion of the work positioned remotely from the electrode comprising a travelling electrode arm having a guide wheel support surface forming a part thereof, a guide roller supporting bracket mounted upon the support surface of said arm and having a guide roller disposed for rotation in a horizontal plane, a guide wheel supporting bracket mounted upon said arm and having an enlarged guide wheel mounted for rotation in a vertical plane thereon, whereby the guide wheel may be angularly disposed out of perpendicular alignment with the portion of the work so that continued advancement of the electrode urges the guide roller into contact with the side of the portion of the work.

HYMAN KORNBLUTT.